(12) United States Patent
Bogman

(10) Patent No.: US 6,962,741 B2
(45) Date of Patent: Nov. 8, 2005

(54) PRESS-ON TOOL AND METHOD FOR PRESSING ON A FILM TO ADHERE TO A SUBSTRATE

(75) Inventor: Frans Wirtje Bogman, Apeldoorn (NL)

(73) Assignee: Vinytouch Vinylapplikaties B.V. (NL)

( * ) Notice: Subject to any disclaimer, the term of this patent is extended or adjusted under 35 U.S.C. 154(b) by 0 days.

(21) Appl. No.: 10/129,452

(22) PCT Filed: Nov. 2, 2000

(86) PCT No.: PCT/NL00/00793

§ 371 (c)(1),
(2), (4) Date: Jul. 30, 2002

(87) PCT Pub. No.: WO01/34409

PCT Pub. Date: May 17, 2001

(65) Prior Publication Data

US 2003/0039787 A1 Feb. 27, 2003

(30) Foreign Application Priority Data

Nov. 3, 1999 (NL) ............................................. 1013473

(51) Int. Cl.[7] ............................................... E04F 21/16
(52) U.S. Cl. ........................... 428/192; 15/121; 15/246; 401/18; 401/25; 401/27; 428/194; 428/217; 428/220
(58) Field of Search ............................... 428/41.8, 41.9, 428/217, 220, 192, 194; 15/121, 246; 156/579, 475, 71; 401/18, 25–27

(56) References Cited

U.S. PATENT DOCUMENTS 4,152,807 A * 5/1979 Smahlik ...................... 15/121
4,449,719 A * 5/1984 Radosay et al. ............. 277/543
6,042,678 A * 3/2000 Johnson et al. ............. 428/41.7
6,138,736 A * 10/2000 Ead et al. .................... 156/579

FOREIGN PATENT DOCUMENTS

| DE | 28 00 237 A | 7/1979 |
| JP | 58160112 | 9/1983 |
| WO | WO 83 04170 A | 12/1983 |

OTHER PUBLICATIONS

Printout of a page of the Royal Sign Supply, Inc. company webpage (http://www.royalbanner.com/computervinyl/applicationproducts.html) which illustrates the 3M PA–1 "gold" squeegee and the 3M SA–1 Low Friction Sleeve.

Blowup of the SA–1 Low Friction Sleeve slipped over the PA–1 plastic applicator.

Printout from the 3M website describing the use of the 3M Low Friction Sleeve SA–1.

* cited by examiner

Primary Examiner—Nasser Ahmad
(74) Attorney, Agent, or Firm—Swanson & Bratschun LLC

(57) ABSTRACT

Press-on tool for pressing on a film to adhere to a substrate. The press-on tool comprises a relatively hard and rigid carrier part with a press-on surface with which, during use, the film can be pressed against the substrate. The intermediate layer comprises a relatively soft, resilient cushion layer. Preferably, the cushion layer is non-slidably connected with the press-on surface and/or the carrier part. The invention also relates to a method for pressing on a film to adhere to a substrate.

2 Claims, 3 Drawing Sheets

PRESS-ON TOOL AND METHOD FOR PRESSING ON A FILM TO ADHERE TO A SUBSTRATE

CROSS REFERENCE TO RELATED APPLICATIONS

Figure 1:
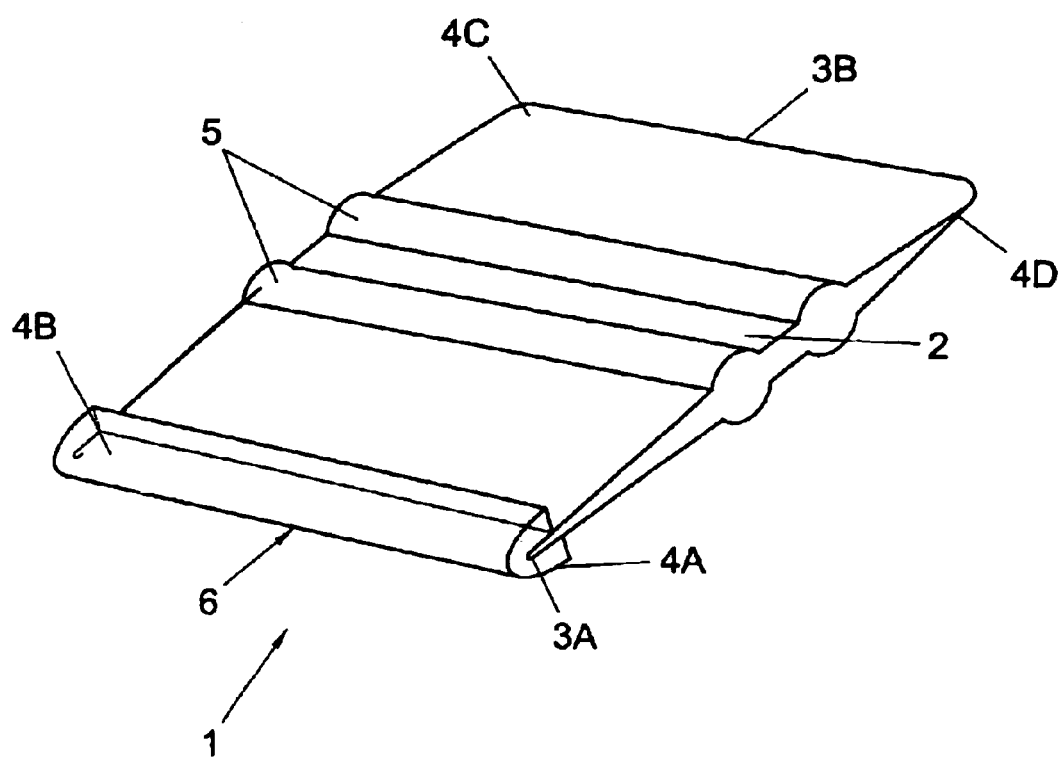

This application is a 371 of International Application Serial No. PCT/NL00/00793, filed on Nov. 2, 2000, which claims priority from Netherlands Application Serial No. 1013473, filed on Nov. 3, 1999, granted as NL 1013473C on May 5, 2001, both entitled, "Press-On Tool and Method for Pressing on a Film to Adhere to a Substrate."

The invention relates to a press-on tool for pressing on a film to adhere to a substrate, comprising a relatively hard and rigid carrier part with a press-on surface with which, during use, film can be pressed against the substrate, which press-on surface is at least partly provided with an intermediate layer with low friction.

Such a press-on tool is called "squeegee" by the skilled person and is open used for applying self-adhesive plastic film to a substrate, for instance a vinyl film provided with advertising imprint to a body part of a vehicle. An example of such a press-on tool is the PA-1 "plastic applicator" of the "gold" type, marketed by the enterprise 3M at St Paul, United States. The carrier part is designed as a substantially flat, elongated plastic spatula, whose longitudinal sides are each provided, on opposite sides, with press-on surfaces adjacent their edges. The intermediate layer is friction-reducing and is formed by a sleeve, which is loosely fitted over the press-on tool, such that the friction between the press-on surface and the film is reduced. The sleeve is marketed by the abovementioned enterprise under the name SA-1 "Low Friction Sleeve".

During use of the press-on tool, the film, after a self-adhesive side thereof has been stripped of a protective sheet and has been placed on the substrate, is manually pressed, with the help of the press-on surface, to adhere to the substrate. The press-on surface is brushed over a reverse side of the film, provided with a protective layer, to press on the film and to remove entrapped air and folds. After the film has been pressed on so as to adhere, the protective layer is removed from the film.

A drawback of the known press-on tool is that it wears out relatively rapidly. In particular irregularities on the surface to which the film is applied relatively easily cause damage to the intermediate layer and/or the press-on surface, thus impeding uniform pressing-on of the film. Additionally, the sleeve causes a substantial decrease of the ease of use of the press-on tool. More in particular, the sleeve can unintentionally slide during use. Furthermore, when the friction between the press-on surface and the film is insufficient for smoothening out, through intensive working, a part of the film, such as, for instance, a fold, a tool has to be taken which has a press-on surface with a higher coefficient of friction. Hence, in practice, the press-on tool is often used without a sleeve, i.e., without the press-on surface being provided with a friction-reducing intermediate layer. This leads to a substantial increase of the effort and the time necessary for applying the film to the substrate.

A further drawback of the known press-on tool is the necessity to provide the film with a protective layer during pressing-on to prevent damage to the film due to the press-on surface or the intermediate layer. This is the case in particular when pressing on pre-printed film or film provided with cuts or interruptions, such as letters or contours. In practice, this leads to the necessity of providing film to be applied with a protective layer (again) after printing or cutting.

The object of the invention is to provide a press-on tool of the type mentioned in the preamble, with which, while maintaining the advantages, the drawbacks mentioned are avoided. To that end, the press-on tool according to the invention is characterized in that the intermediate layer comprises a relatively soft, resilient cushion layer. What is thus achieved is that the pressure exerted on the film by the press-on surface can be distributed better and that irregularities in the substrate can be accommodated to. On the one hand, this leads to a reduced chance of damage to the intermediate layer and/or the press-on surface, so that the tool life of the press-on tool can be substantially prolonged. On the other hand, this leads to a substantial decrease of the chance of damage to the film. What is achieved in this manner is that preprinted film and films having cuts or interruptions can, without any protective layer on the film, be pressed upon, which leads to a substantial saving of time and material.

In a further embodiment, the cushion layer is connected in a non-slidable manner with the press-on surface and/or carrier part. The cushion layer can be directly connected with the press-on surface, but can also be provided on the press-on surface through an intermediate support part, for instance a rigid support disc. Preferably, the cushion layer is connected with the press-on surface by means of a layer of adhesive. Thus, the handling ease of the press-on tool is greatly enhanced.

In another embodiment, the press-on tool comprises a further press-on surface on which no cushion or intermediate layer is provided. What is thus achieved is that the press-on tool can be provided in a simple manner with a further press-on surface with a higher friction for intensively working the film surface. When the carrier material has a higher coefficient of friction than the material of the cushion or intermediate layer, this can be realized in a simple manner by giving the intermediate layer dimensions such that a part of the carrier is free to serve as a further press-on surface.

In yet another embodiment, the cushion layer is designed as a detachable adhesive strip of soft, resilient material. Thus, it is achieved that the cushion layer can be replaced in a simple manner.

In a still further embodiment, the cushion layer is made of felt. What is thereby achieved is that the pressure exerted by the press-on surface on the film can be very well distributed.

In a next embodiment, the cushion layer is designed as a woven. What is thereby achieved is that the cushion layer has a high resistance to wear.

In yet another embodiment, the cushion layer is made of wool. What is thereby achieved is that the cushion layer can not only be very soft, but also very wear-resistant.

In a very advantageous embodiment, the cushion layer is designed as a strip of woolen, felted fabric with a layer of adhesive with which the strip can be detachably provided onto the press-on surface.

The invention also relates to a method for applying film to a substrate, wherein, with the aid of a press-on surface of a press-on tool, film is pressed to adhere to a substrate and wherein, between the press-on surface of the press-on tool and the film, a cushion layer is provided. When applying the film, contact pressure can be exerted through a cushion layer with low friction, provided between the press-on surface of the press-on tool and the film. Preferably, during pressing-on, the cushion layer is contacted directly and without a further protective layer with a side of the film which is preprinted or provided with cuts or interruptions.

The invention further relates to a low-friction cushion layer for a press-on tool designed as an adhesive strip.

Further advantageous embodiments of the press-on tool and the method are represented in the subclaims.

Figure 2:
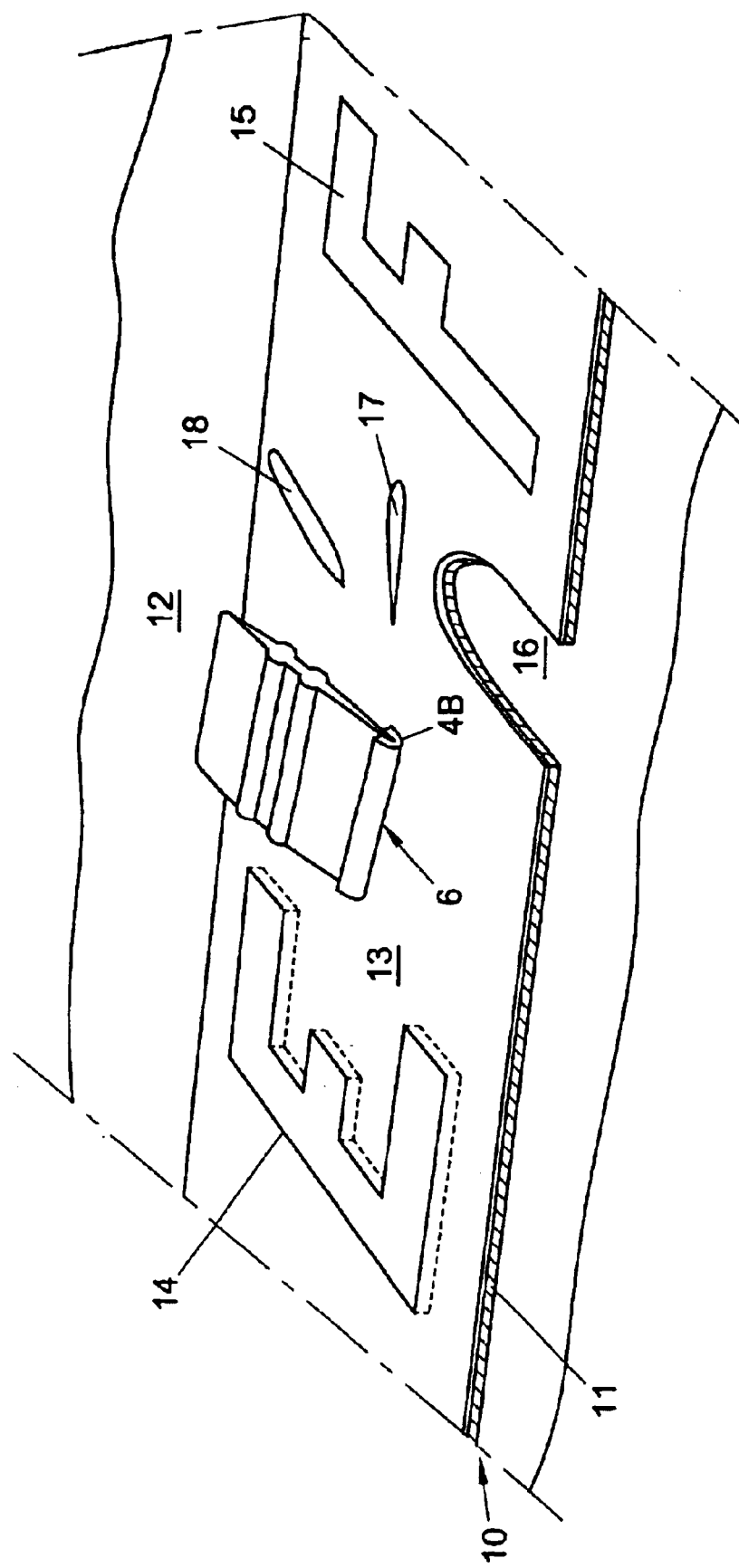
Figure 3:
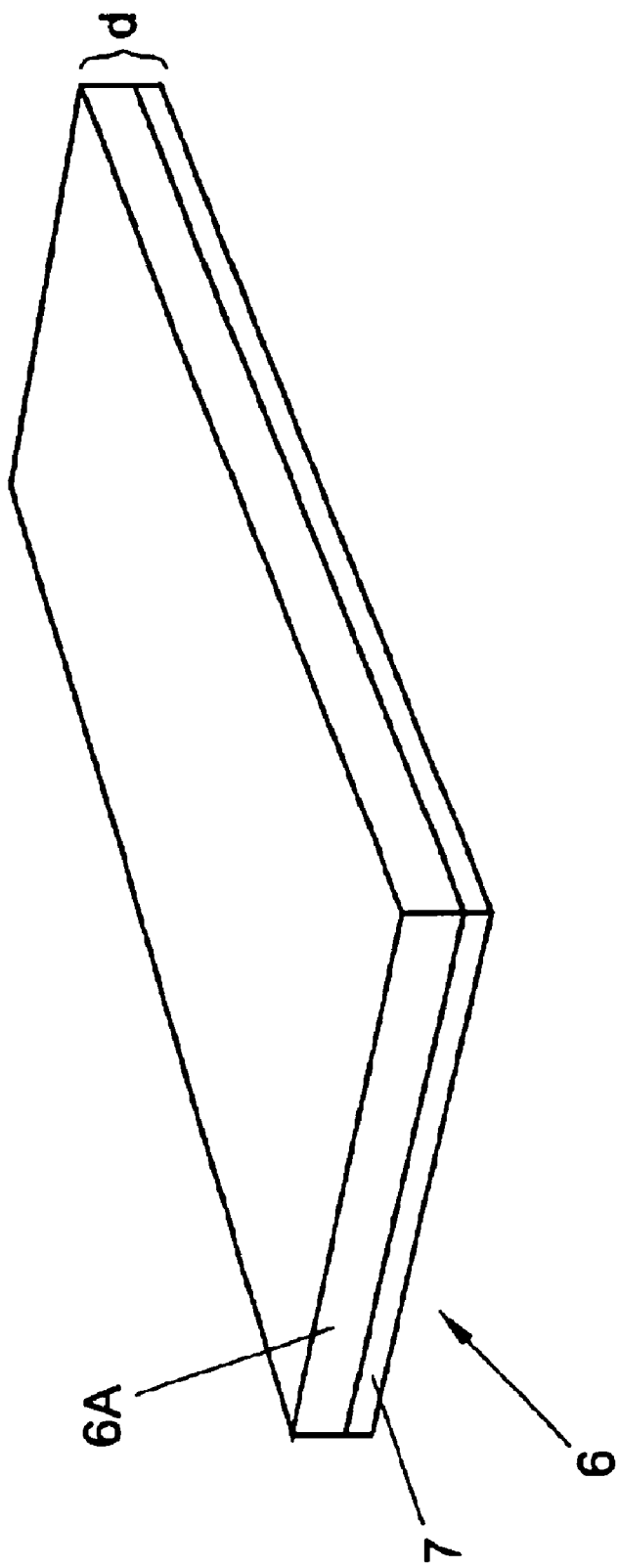

The invention will be further elucidated on the basis of an exemplary embodiment, represented in a drawing. In the drawing:

FIG. 1 shows a schematic perspective view of the press-on tool;

FIG. 2 shows a schematic perspective view of the press-on tool while pressing the film onto a substrate; and FIG. 3 shows a schematic perspective view of a cushion layer designed as an adhesive strip It is noted that the drawings are only schematic representations of an exemplary embodiment of the invention. In the Figures, identical or corresponding parts are designated by the same reference numerals.

FIGS. 1 and 2 show a press-on tool 1 for pressing on a film 10 to adhere to a substrate 12. The substrate 12 is substantially smooth, such as a varnished steel plate or plastic body part of a vehicle. The press-on tool 1 comprises a substantially flat, elongated plastic spatula 2. The longitudinal sides of the spatula taper and are each, adjacent the edge 3A, 3B provided on both sides with press-on surfaces 4A, 4B, 4C and 4D. The press-on surfaces have a length of, for instance, 80-120 mm and a width of, for instance, 0.5-5 mm, depending on the angle of incidence between spatula 2 and the substrate 12 and the degree of deflection of the spatula 2.

The press-on tool 1 is provided, adjacent the middle, with ribs 5 for offering support to the fingers of a user when, during use, the press-on tool is manually pressed on the film 10.

The press-on surfaces 4A and 4B of the press-on tool 1 are provided with an intermediate layer with low friction, which is designed, with respect to the hard, rigid carrier material, as a relatively soft, resilient cushion layer. The cushion layer is compressible and is designed as an adhesive strip 6, which is applied over the press-on surfaces 4A and 4B. The adhesive strip 6 is made of felted woolen fabric 6A, provided at its underside with a layer of adhesive (FIG. 3). The layer of adhesive can be designed as a strip of double-sided adhesive tape 7, so that the cushion layer is not slideably but detachably connected to the spatula 2. The thickness of the cushion layer is preferably greater than or equal to approximately 0.5 mm, in particular greater than or equal to approximately 1.0 mm. Further, the thickness of the cushion layer is preferably less than or equal to approximately 5 mm, in particular less than or equal to approximately 2 mm. A very good result is obtained with a cushion layer having a thickness of approximately 1 mm. The adhesive strip 6 can be supplied in a form already having suitable dimensions, but can also be separated from a larger strip which, for instance, has been rolled up into a roll provided with predefined perforations. Referring to FIG. 2, during use of the press-on tool 1, the film 10, after a self-adhesive side 11 thereof has been stripped of a protective layer (not shown), is placed on the substrate 12 and, with the aid of the press-on surface 4B, pressed manually to adhere to the substrate 12. The press-on surface 4B is then brought in direct contact with the display side 13 of the film, provided with letter incisions 14, printing 15 and for interruptions 16.

In such case, a protective layer can be left out. The cushion layer provides that entrapped air bubbles 17 and creases 18 in the film 10 can then be smoothed out without damaging the display side 13, so that a good adhesion is effected between the film 10 and the substrate 12.

If necessary, a part of the film 10 which is to be worked more intensively, for instance a part where a persistent fold 18 is present in the surface, can be brought into contact with one of the press-on surfaces 4C or 4D. These press-on surfaces are not provided with an intermediate or cushion layer and have a higher coefficient of friction. Then, only the position of the press-on tool 1 needs to be changed and no further press-on tool needs to be taken.

It is noted that, in this context, an intermediate layer having low friction must at least be understood to mean a layer with a coefficient of friction lower than the coefficient of friction of the spatula material of a common plastic spatula, such as, for instance, the PA-1 plastic applicator mentioned, which layer, during use, is positioned between the press-on surface and the surface of the film to be pressed on. In particular, an intermediate layer having low friction must be understood to mean a friction-reducing layer with a coefficient of friction which is in the order of, or which is lower than, the coefficient of friction of the material of the SA-1 sleeve referred to.

It is also noted that the low-friction intermediate layer can be integrated into the carrier part, for instance by providing the relatively soft, resilient intermediate layer on the press-on surface of the relatively hard, rigid carrier part by means of two-component injection molding. Further, the cushion layer can be provided on a support disc which can be fitted on the carrier, for instance by means of a snap or clamped connection. In addition, the cushion layer can be clamped directly onto the carrier or be stretched onto it. To support the clamping action, the cushion layer can be provided with stiffening means, integrated into the cushion layer, such as an impregnated, resilient plastic or stiffening wires.

It is also noted that in FIGS. 2 and 3, the thickness of the film 10 and the adhesive strip 6 are represented in an enlarged manner. In particular, this holds true for the thickness of the layer of glue on the self-adhesive side 11 of the film and the strip of double-sided adhesive tape 7.

It is further noted that the invention is not limited to the exemplary embodiment discussed here and that many variant embodiments are possible.

For instance, the carrier part of the press-on tool can be manufactured from a different material than plastic, for instance wood, metal or combinations of materials, and the press-on tool can be used for applying film to windows, walls and boards. Further, the dimensions of the press-on tool can be chosen differently and the press-on tool can be part of a machine with which film is mechanically pressed on a substrate. This can be advantageous in particular when applying film to a door frame or window frame in substitution of a coat of paint. The cushion layer can also be made of a non-woven material and the intermediate layer can be clamped onto the carrier. The carrier can also be entirely enveloped with a cushion layer. It is furthermore possible that the film is not self-adhesive, for instance when the substrate is provided with a layer of adhesive or when the film can be adhered to the substrate by means of static electricity.

Such variants will be clear to the skilled person and are understood to fall within the scope of the invention as set forth in the following claims.

What is claimed is:

1. A press-on tool for pressing on a film to adhere to a substrate, comprising:

a relatively hard and rigid carrier comprising opposite top and bottom sides with each of the top and bottom sides comprising two planar press-on surfaces located adjacent distinct edges, the planar press-on surfaces of each of the top and bottom sides being spaced apart from each other;

an intermediate layer comprising a relatively soft, resilient cushion layer having a coefficient of friction less than the press-on surfaces;

at least one of said planar press-on surfaces having the intermediate layer non-slidably connected thereto for contacting the film; and at least one other of said planar press-on surfaces being free from the intermediate layer.

2. The press-on tool according to claim 1 where said relatively hard and rigid carrier has at least two pairs of press-on surfaces on the opposite top and bottom sides of the relatively hard and rigid carrier, the press-on surfaces of each pair being separated by an adjacent edge, the intermediate layer covering a portion of each press-on surface and the adjacent edge of at least one pair of press-on surfaces and the at least one other pair of press-on surfaces being free from the intermediate layer.

* * * * *